J. T. HICKMAN, Jr.
POWER DRIVEN CULTIVATOR.
APPLICATION FILED JULY 7, 1916.
1,231,352.
Patented June 26, 1917.
2 SHEETS—SHEET 2.
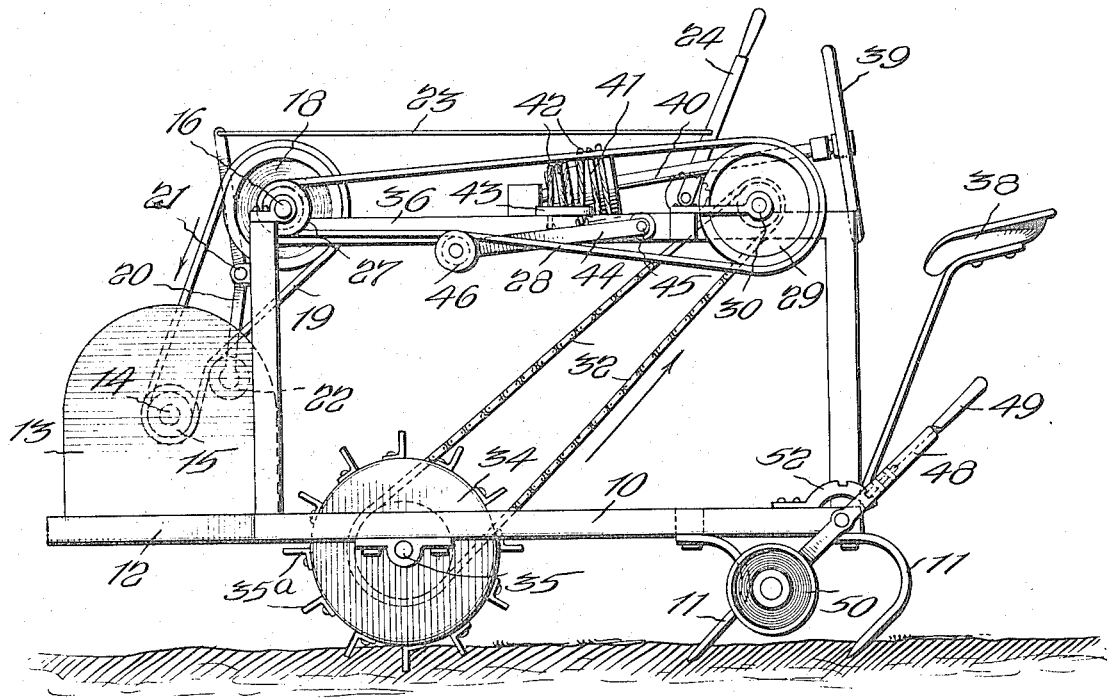
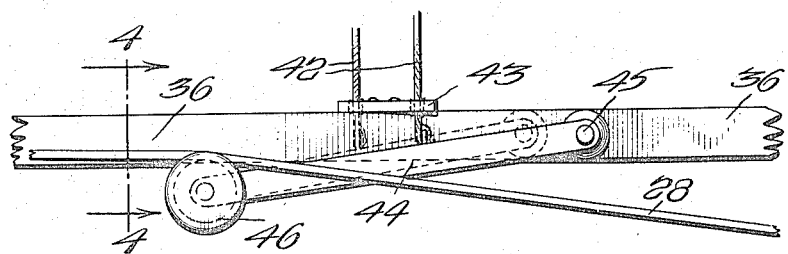
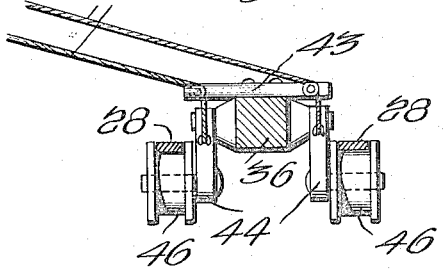
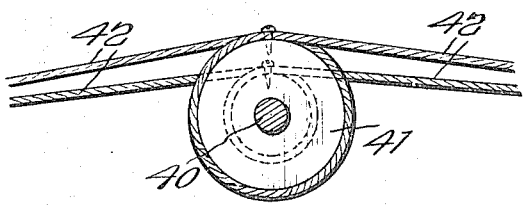
WITNESSES
E. M. Carraghan
Myron G. Olear
INVENTOR
JAMES T. HICKMAN JR.,
BY
ATTORNEYS

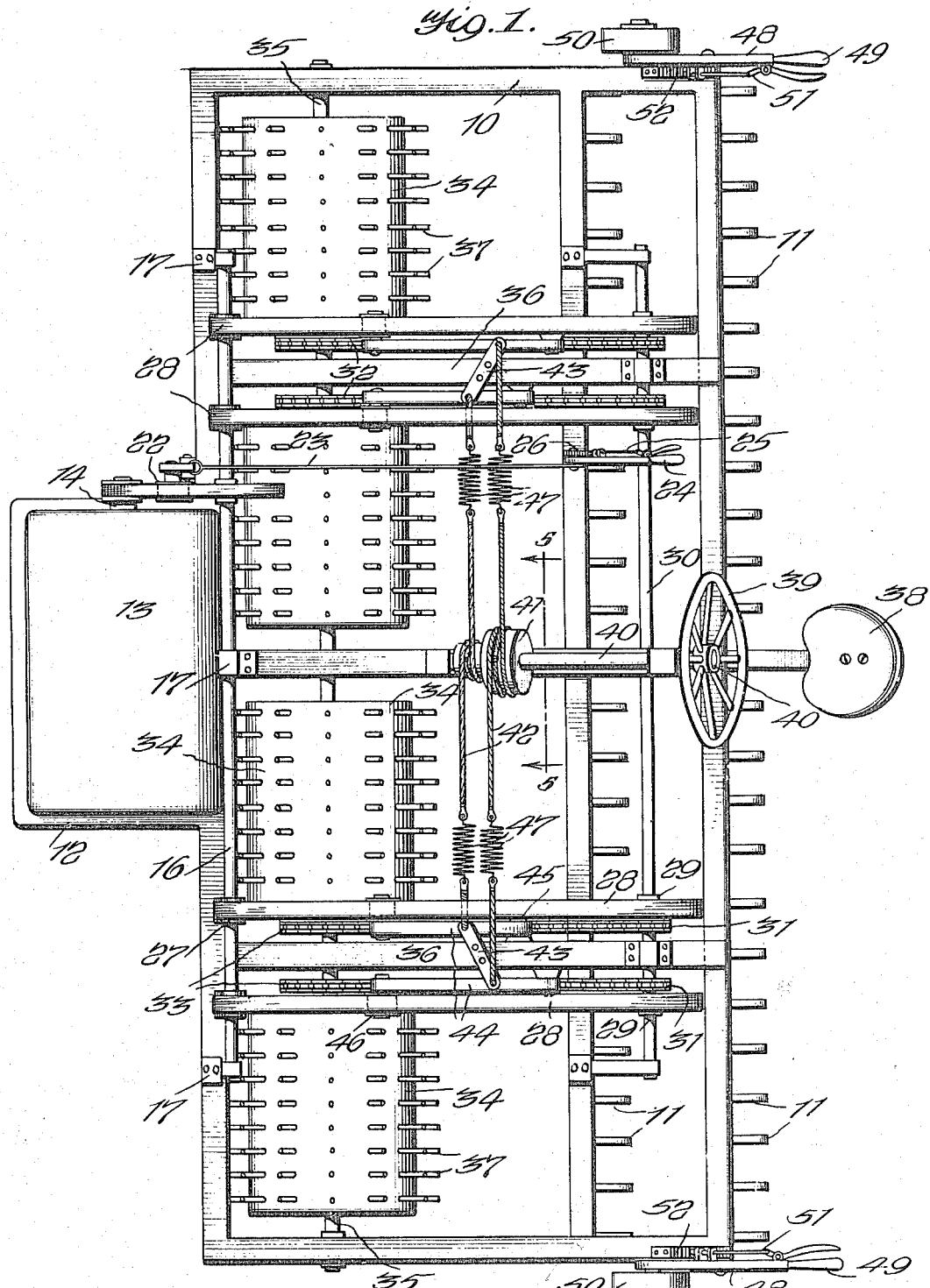

UNITED STATES PATENT OFFICE.

JAMES T. HICKMAN, JR., OF SPRINGPORT, INDIANA.

POWER-DRIVEN CULTIVATOR.

1,231,352.  Specification of Letters Patent.  Patented June 26, 1917.

Application filed July 7, 1916. Serial No. 108,006.

*To all whom it may concern:*

Be it known that I, JAMES T. HICKMAN, Jr., a citizen of the United States, and a resident of Springport, in the county of Henry and State of Indiana, have invented a certain new and useful Improvement in Power-Driven Cultivators, of which the following is a specification.

My present invention relates generally to cultivators, and more particularly to a power driven cultivator which will work in soft, fresh plowed ground without packing the ground as if horse-drawn, which will enable the cultivation of two or more rows at a time, accurate steering, and in which the power driven parts will act to assist in the cultivation of the ground.

The means which I preferably utilize in carrying out the foregoing object, will be better understood by reference to the following description, the several parts being shown in the accompanying drawings, forming a part of this specification, and in which:

Figure 1 is a plan view of my improved cultivator.

Fig. 2 is a side view thereof.

Fig. 3 is a detail elevation of certain parts of the steering arrangement.

Fig. 4 is a detail vertical section taken substantially on line 4—4 of Fig. 3.

Fig. 5 is a detail vertical section taken substantially on line 5—5 of Fig. 1.

Referring now to these figures, my invention contemplates the provision of a rectangular main frame 10, along the lower rear portion of which, in parallel transverse rows, are mounted cultivator implements in the form of teeth 11, and centrally at the lower forward portion of which is an extension frame 12 supporting a motor generally indicated at 13, the driving shaft 14 of which projects at one side and is provided with a pulley 15.

Parallel with and above the upper forward portion of the main frame 10, is a line shaft 16, journaled in bearings 17, and provided with a pulley 18 connected by a belt 19 with the pulley 15 of the driving shaft 14 of the motor, it being noted that the belt 19 is normally loose and inoperative as a driving connection.

A belt tightening lever 20 is mounted at the forward portion of the main frame 10, and intermediately fulcrumed at 21 thereon in a substantially vertical position, the lower end of this lever having a roller 22 for engagement with the belt 19, and the upper end thereof being connected by a connecting rod 23 to a lever 24 mounted at the upper rear portion of the main frame and having a latch mechanism 25 in engagement with a notched quadrant 26 whereby to hold the lever 20 in the position shown in Fig. 2 for instance and in engagement with the belt 19 to tighten the same around the pulleys 16 and 18 and thus transmit rotary motion from the driving shaft 14 to the line shaft 16.

The line shaft 16 is also provided with a plurality of small pulleys 27 around which are extended the forward ends of normally loose belts 28, the rear portions of which are extended around pulleys 29 mounted upon an intermediate shaft 30 transversely of the upper rear portion of the main frame 10, these pulleys 29 being preferably loose upon the intermediate shaft 30 and each having secured thereto a small sprocket wheel 31.

The sprocket wheels 31 are connected by sprocket chains 32 to a large sprocket wheel 33 mounted at and secured to the adjacent ends of pairs of driving drums or rollers 34, the series of which are preferably mounted loose upon a transverse shaft 35 secured in the lower forward portion of the main frame 10, as plainly seen by a comparison of Figs. 1 and 2, it being noted that there is a similar number of drums upon opposite sides of the longitudinal axis of the machine, for a purpose to be presently described, in the present instance a pair of these drums 34 being at each side, with their sprocket wheels 33 at the adjacent ends thereof, in order that the belts 28 may be in parallel lines adjacent one another at opposite sides of the main frame and upon opposite sides of upper longitudinal bars 36 of the main frame.

By reference to Figs. 1 and 2 it will be noted that the peripheries of the several drums 34 have rows of teeth, pins, or spikes 37 or angle bars 35ᵃ and that, traveling as these drums do in front of the rows of cultivating implements or teeth 11, their spikes, pins, or teeth 37 or angle bars 35ᵃ will enter the ground in driving the frame forwardly and will not only obviate packing of newly plowed ground, but will in fact assist in the cultivating operation which my improved cultivator is designed to accomplish.

In front of the operator's seat 38, located at the upper rear portion of the main frame 10, is a steering wheel 39 secured upon the upper rear end of a steering post 40, projecting forwardly and downwardly, and having at its forward end, adjacent the center of the frame, pulleys 41 over which flexible steering connections 42 extend, these flexible members 42 being given one complete turn intermediate their ends around the pulleys 41, and being arranged in pairs with their outer extremities depending through guide pieces 43 secured to the intermediate frame bars 36 just above mentioned, and secured to belt tightening levers 44 intermediate the ends of the latter. These belt tightening levers are pivoted at their rear ends at 45 to the frame bars 36, and carry rollers 46 at their forward ends beneath the lower runs of the belts 28 between the line shaft 16 and the intermediate shaft 30, so that at any time desired by the operator, the normal tension of the connections 42 to tighten the belts 28 of the entire series and thus maintain the same in operative position, may be increased at one side of the frame and correspondingly decreased at the opposite side for steering purposes, close coiled springs 47 being preferably interposed in the length of the connections 42 between the pulleys 41 and the guides 43 in order to obviate undesirably strong tension upon the belt tightening levers 44 at either side of the frame when the opposite side thereof is slacked in turning either to the right or to the left.

At the lower rear portions of the main frame 10, and at the opposite side thereof, are intermediately pivoted levers 48 having handles 49 at their upper ends and ground engaging rollers or wheels 50 at their lower ends, which by manipulation of the levers 48 may be lowered into engagement with the ground, lifting the rear portion of the main frame, and lifting the cultivator teeth 11 out of contact with the surface of the ground, so that the machine as a whole may be readily transported from field to field without dragging the cultivator teeth 11, the levers 48 to this end having latch mechanisms 51 in engagement with notched quadrant 52 mounted upon the main frame, to hold the levers 58 in adjusted position.

It is thus to be seen that I provide a simple, strong, and efficient construction in the nature of a self-propelled device of this character, and one in which the traction devices materially assist in the desired operation upon the soil, as well as obviating all undersirable packing of the ground.

It is further obvious that I provide a device which may be readily controlled and manipulated, which may be readily transported from place to place, under its own power, and which will be durable and efficient in its operation for the purposes hereinbefore set forth.

I claim:—

1. In a machine of the character described, the combination of a generally rectangular frame, cultivating implements arranged in the lower rear portion of the frame, a transverse series of spiked rollers arranged in the lower forward portion of the frame to engage the ground in advance of the cultivating members, a driving motor, and driving connections between the said motor and the said series of spiked rollers, said driving connections including a normally loose belt, a belt tightening lever fulcrumed in the frame and having a roller engaging the said belt, and a controlling lever having connection with the said belt tightening lever and under control of the operator, for the purpose described.

2. In a machine of the character described, the combination of a generally rectangular frame, a series of cultivating implements extending across the lower rear portion of the frame, a transverse series of spiked rollers extending across the lower forward portion of the frame to engage the ground in advance of the series of cultivating members, a driving motor, and driving connections between the said motor and the said series of spiked rollers, said spiked rollers being arranged in equal numbers upon opposite sides of the longitudinal axis of the frame, and controlling connections whereby to check rotation of the spiked rollers upon one side of the axis of the frame.

3. In a machine of the character described, the combination of a generally rectangular frame, cultivating implements arranged in the lower rear portion of the frame, a transverse series of spiked rollers arranged in the lower forward portion of the frame to engage the ground in advance of the cultivating members, a driving motor, driving connections between the said motor and the said series of spiked rollers including normally loose belts, said spiked rollers being arranged in equal numbers upon opposite sides of the longitudinal axis of the frame, and controlling connections whereby to check the rotation of the spiked rollers upon one side of the axis of the frame, said controlling connections including a steering post belt controlling members connected to said post and a steering wheel, the latter of which is under the manual control of the operator.

JAMES T. HICKMAN, Jr.

Witnesses:
 HARRY LEE ESTABROOK,
 ROSE HICKMAN ESTABROOK.